(12) United States Patent
Shin

(10) Patent No.: US 12,113,475 B2
(45) Date of Patent: Oct. 8, 2024

(54) SOLAR PHOTOVOLTAIC ROTATION DEVICE HAVING BACKLASH CONTROL STRUCTURE

(71) Applicant: Jeong Hoon Shin, Suncheon-si (KR)

(72) Inventor: Jeong Hoon Shin, Suncheon-si (KR)

( * ) Notice: Subject to any disclaimer, the term of this patent is extended or adjusted under 35 U.S.C. 154(b) by 0 days.

(21) Appl. No.: 18/020,428

(22) PCT Filed: Jul. 20, 2021

(86) PCT No.: PCT/KR2021/009295
§ 371 (c)(1),
(2) Date: Feb. 9, 2023

(87) PCT Pub. No.: WO2022/045588
PCT Pub. Date: Mar. 3, 2022

(65) Prior Publication Data
US 2024/0039458 A1 Feb. 1, 2024

(30) Foreign Application Priority Data

Aug. 28, 2020 (KR) .......................... 10-2020-0109611

(51) Int. Cl.
*H02S 20/30* (2014.01)
*F16H 1/18* (2006.01)
(Continued)

(52) U.S. Cl.
CPC ............... *H02S 20/30* (2014.12); *F16H 1/18* (2013.01); *F16H 1/2854* (2013.01); *F16H 57/12* (2013.01)

(58) Field of Classification Search
CPC . H02S 20/32; F24S 2030/11; F24S 2030/134; F16H 2057/128; F16H 1/2854;
(Continued)

(56) References Cited

U.S. PATENT DOCUMENTS 7,479,089 B2 * 1/2009 Yamanaka ............... F16H 57/12
475/344
2006/0117886 A1 * 6/2006 Ohno ........................ F16H 1/06
74/423
(Continued)

FOREIGN PATENT DOCUMENTS

CN 105387140 A * 3/2016
CN 105387153 A * 3/2016
(Continued)

OTHER PUBLICATIONS

Matsumoto, Yoichi, "Aligning the planets: gearheads used to position motors must be able to transmit motor rotation correctly. To do this backlash and position error must be minimized", Oct. 2004, Motion System Design 46.10, Penton Media, (Year: 2004).*
(Continued)

*Primary Examiner* — Bobby Rushing, Jr.
(74) *Attorney, Agent, or Firm* — CANTOR COLBURN LLP

(57) ABSTRACT

The present invention provides a solar photovoltaic rotation device installed the top of a pole so as to rotate a solar panel array, the device comprising: a first tubular body; a second tubular body; a gear unit; and a driving motor, wherein the gear unit is formed as a planet gear set comprising: a sun gear connected to a rotational shaft of the driving motor; multiple PL gears disposed around the sun gear to be engaged with the sun gear; and a ring gear disposed outside of the multiple PL gears to be engaged with the PL gears, the ring gear being fixed to the first tubular body, and at least one among the sun gear, the PL gears, and the ring gear has inclined teeth formed on the circumferential surface thereof, and thus has a tapered structure.

1 Claim, 10 Drawing Sheets

(51) Int. Cl.
*F16H 1/28* (2006.01)
*F16H 57/12* (2006.01)
(58) Field of Classification Search
CPC ............... F16H 57/12; F16H 2057/126; F16H 2057/127
See application file for complete search history.

(56) References Cited

U.S. PATENT DOCUMENTS

2006/0135312 A1* 6/2006 Shiina .................. F16H 35/008
475/339
2011/0132433 A1 6/2011 Tanaka et al.

FOREIGN PATENT DOCUMENTS

| | | | | | |
|---|---|---|---|---|---|
| CN | 105387154 | A | * | 3/2016 | |
| CN | 105387155 | A | * | 3/2016 | |
| CN | 108431453 | A | * | 8/2018 | ............... F16H 1/28 |
| CN | 104870910 | B | * | 11/2018 | ............ F24S 30/425 |
| CN | 110219948 | A | * | 9/2019 | ................ F16H 1/36 |
| DE | 3734462 | A1 | * | 4/1989 | ........... F16H 1/2836 |
| DE | 19712516 | A1 | * | 10/1998 | ........... F16H 1/2836 |
| JP | 2006264411 | A | | 10/2006 | |
| JP | 2012039130 | A | | 2/2012 | |
| JP | 2018535361 | A | | 11/2018 | |
| KR | 1020110024887 | A | | 3/2011 | |
| KR | 1020120017364 | A | | 2/2012 | |
| KR | 1020140132032 | A | | 11/2014 | |
| KR | 1020160086729 | A | | 7/2016 | |
| KR | 1020200095971 | A | | 8/2020 | |
| WO | WO-2009118218 | A1 | * | 10/2009 | ............. F16H 57/12 |
| WO | 2012073705 | A1 | | 6/2012 | |

OTHER PUBLICATIONS

International Search Report mailed Oct. 26, 2021 for PCT/KR2021/009295.

* cited by examiner

SOLAR PHOTOVOLTAIC ROTATION DEVICE HAVING BACKLASH CONTROL STRUCTURE

TECHNICAL FIELD

The present application claims priority to Korean Patent Application No. 10-2020-0109611 filed on Aug. 28, 2020 in the Republic of Korea, all disclosure of which is incorporated herein.

The present disclosure relates to a rotation device for photovoltaic power generation, and more particularly, to a rotation device for photovoltaic power generation installed at a pole to provide a rotation force to a solar panel.

BACKGROUND ART

In general, photovoltaic power generation systems are built by installing a collection of solar panels in an array over the areas of forests, fields, fallow lands, roofs of buildings, reservoirs and salt ponds.

In case that the sites for solar power plants are forests, fields or farmlands, it is necessary to perform a pre-construction process including deforestation or civil engineering on the sites prior to installing frame structures and solar panels, causing environmental degradation such as massive loss of trees and soil and high landslide risks. Due to these negative impacts, although forests and fields meet the optimal site requirements for solar power plants, in reality, it is not easy to build solar power plants in forests and fields.

Korean Patent Publication No. 2011-0024887 discloses a self-supporting photovoltaic power generation system that is installed at rooftops of buildings or banks in a non-destructive manner. The self-supporting photovoltaic power generation system includes pillar assemblies, each including at least one pillar continuously connected to each other, and light collecting plates coupled onto the pillar assemblies, wherein each pillar has an inclined upper surface and a filler accommodation space in which a filler is received therein.

Korean Patent Publication No. 2016-0086729 discloses a method for installing a photovoltaic module without occupying fields and paddies, and more particularly, a photovoltaic module that is installed in paddies, comprising a lower support, an installation fixing frame and a support frame to easily install the photovoltaic module in fields and paddies in the non-agricultural season after harvest and a method for installing the photovoltaic module. Korean Patent Publication No. 2016-0086729 further discloses a photovoltaic module having a structure in which a plurality of easy-to-install photovoltaic modules is installed by connecting an installation fixing frame of an easy-to-install photovoltaic module to a side of a protection frame of another easy-to-install photovoltaic module with a hinge means so that it is folded when not in use and extended while in use.

However, the conventional photovoltaic power generation systems still cause the destruction of nature in the construction due to the large area occupied by the frame structures which support the solar panels, and accordingly its solution is required.

Additionally, in general, the conventional photovoltaic power generation systems include solar panels fixedly installed, resulting in low photovoltaic power generation efficiency. There are some systems for moving solar panels along the movement of the Sun in the photovoltaic power generation applications, but it is not easy to build the systems due to the complicated architecture and high price.

To increase the photovoltaic power generation efficiency, it is desirable to rotate the solar panel along a predetermined path taking the amount of sunlight into account. However, in case that the solar panel is placed on top of a pole and simply connected to the rotation axis of a driving motor to cause it to rotate, overloads may be applied to the rotation axis of the driving motor, and when external forces such as winds are applied, the connected part of the rotation axis and the solar panel is deformed or damaged and a short circuit occurs in the wiring at the rotating part, and accordingly its solution is required.

Additionally, when winds are applied to the solar panel, the solar panel sways by backlash in a gear assembly installed between the driving motor and the solar panel, and in worse case, accidents may occur such as damage in the gear assembly and a collapse of the solar panel.

DISCLOSURE

Technical Problem

The present disclosure is designed to solve the above-described problem, and therefore the present disclosure is directed to providing a rotation device for photovoltaic power generation having a structure for preventing unnecessary backlash in a gear assembly of the rotation device.

The present disclosure is further directed to providing a rotation device for photovoltaic power generation having a structure for rotating a solar panel using a simple driving device to achieve solar power plant installation cost savings and rotating the solar panel using electricity produced from the solar panel.

The present disclosure is further directed to providing a rotation device for photovoltaic power generation for preventing deformation or damage at a connected part of the rotation device and the solar panel and a short circuit in wiring at a rotating part due to external forces such as winds.

Technical Solution

To achieve the above-described objective, the present disclosure provides a rotation device for photovoltaic power generation installed on top of a pole to rotate a solar panel array, including: a first tubular body connected to the solar panel array; a second tubular body coupled below the first tubular body and fixed to the top of the pole; a gear unit to transmit a rotation force to the first tubular body; and a driving motor fixed to an inside of the second tubular body to provide the rotation force to the gear unit, wherein the gear unit includes a planetary (PL) gear set including a sun gear connected to a rotation axis of the driving motor, a plurality of PL gears arranged at a preset interval around the sun gear to be engaged with the sun gear and a ring gear disposed outside of the plurality of PL gears and fixed to the first tubular body to be engaged with the PL gears, and wherein at least one of the sun gear, the PL gears or the ring gear has inclined teeth in a circumferential surface and has a tapered structure.

Preferably, the inclined teeth are formed in all an outer circumferential surface of the sun gear, an outer circumferential surface of the PL gears and an inner circumferential surface of the ring gear to ensure necessary backlash in a gear contact surface during rotation, and prevent unnecessary backlash when the rotation ends by the tight engagement therebetween by the tapered structure.

A force may be applied in an insertion direction of the plurality of PL gears into the sun gear and the ring gear by gravity or an elastic force.

The rotation device for photovoltaic power generation may include an upper frame installed on the plurality of PL gears to hold the plurality of PL gears, and the elastic force may be supplied by a wave spring disposed on the upper frame to press down the plurality of PL gears.

Alternatively, the rotation device for photovoltaic power generation may include an upper frame installed on the plurality of PL gears to hold the plurality of PL gears, and the plurality of PL gears may precisely move toward the upper frame during the gear rotation to ensure backlash between the sun gear and the ring gear, and when the gear rotation ends, move toward the sun gear and the ring gear by self-weights to prevent backlash.

Advantageous Effects

The rotation device for photovoltaic power generation according to the present disclosure has the following effects.

Firstly, the planetary gear set of the gear unit is configured to ensure necessary backlash during rotation, and prevent unnecessary backlash when the rotation ends by the planetary (PL) gears, the sun gear and the ring gear configured to come into close contact with each other by the tapered structure, thereby preventing the solar panels from swaying in the wind.

Secondly, the assembly of the bearing and the first and second tubular bodies makes it possible to firmly support the solar panel array installed at the pole and stably transmit the rotation force without swaying by vibrations or external forces such as winds.

Thirdly, despite the diameter of the first tubular body and the second tubularbody designed at the equal or similar level to the diameter of the pole, it is possible to ensure smooth rotation and precise rotation control on a second-by-second basis by the bearing interposed between the first tubular body and the second tubular body.

Fourthly, the rotation device achieves size reduction and simple design, leading to fast return of investment, thereby overcoming the drawbacks of the existing solar tracker, a high failure rate and high price.

Fifthly, since the solar panels are supported by the pole, the solar panels are spaced a sufficient distance apart from the ground, leading to smooth air flow, thereby suppressing the temperature rise of the solar panels, resulting in increased photovoltaic power generation efficiency.

Sixthly, in case that the sites for solar power plants are forests and fields, it is possible to maintain trees around the pole which supports the solar panels, thereby minimizing the destruction of nature.

BEST MODE

Figure 1:
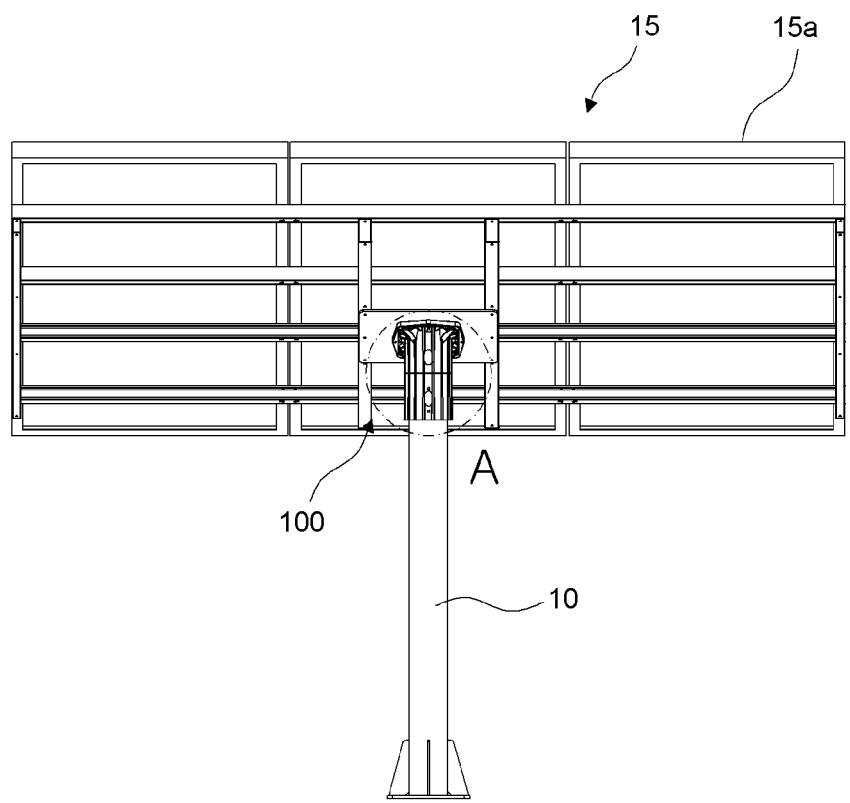
FIG. 1 is a rear view showing the appearance of a rotation device for photovoltaic power generation according to a preferred embodiment of the present disclosure.
Figure 2:
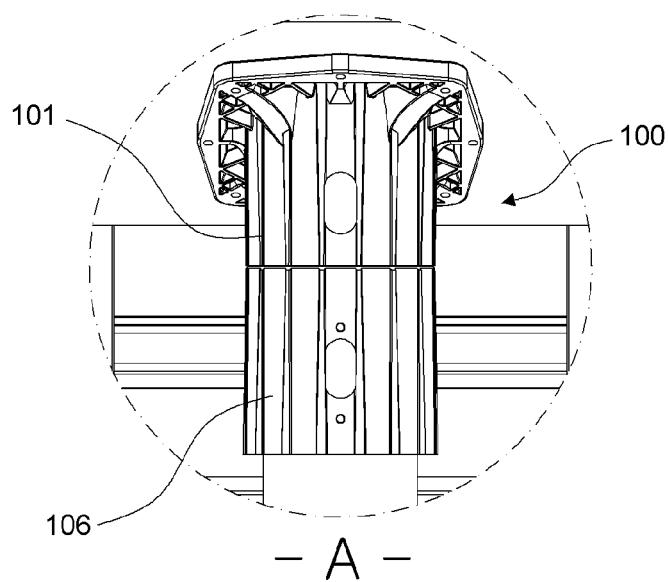
FIG. 2 is a partial enlarged view of the rotation device in FIG. 1.
Figure 3:
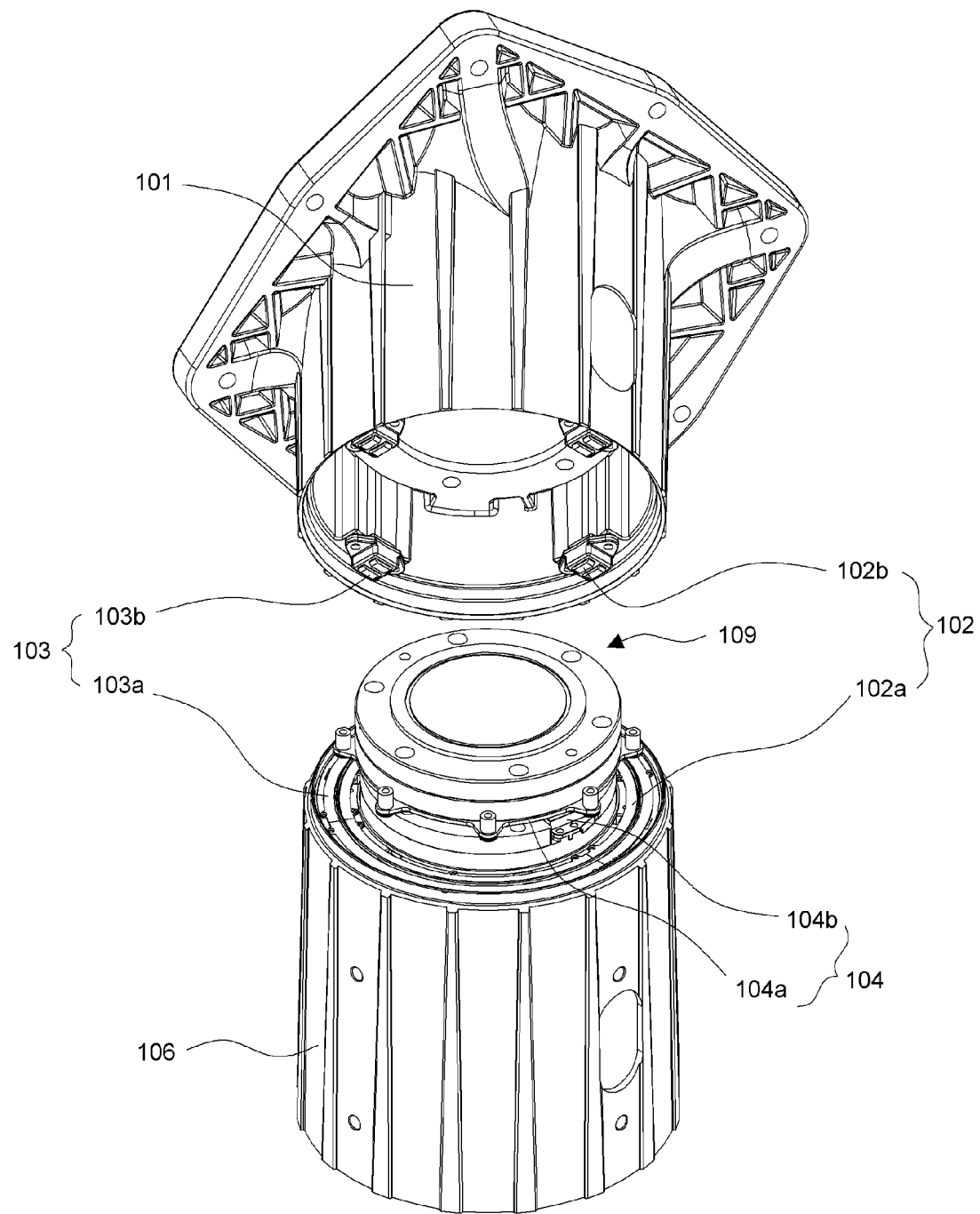
FIG. 3 is an exploded perspective view showing the internal configuration of the rotation device in FIG. 2.
Figure 4:
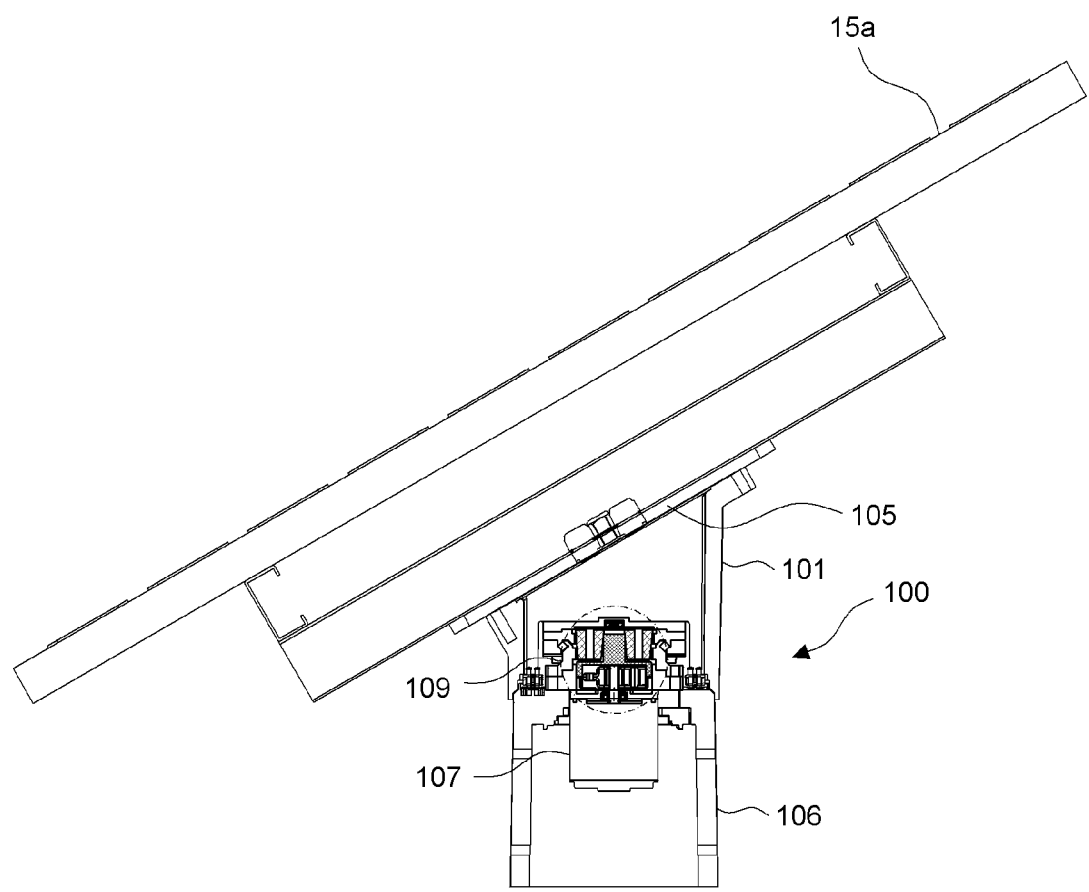
FIG. 4 is a partial cross-sectional view of FIG. 1.
Figure 5:
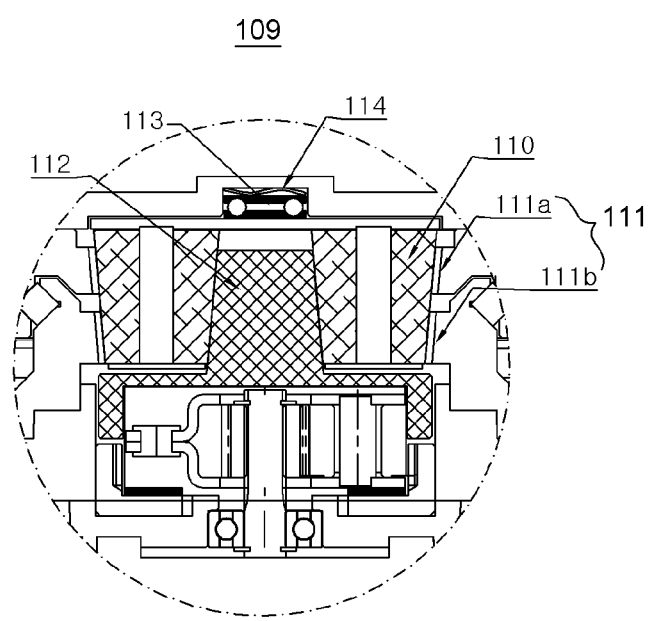
FIG. 5 is a partial enlarged cross-sectional view showing the configuration of the gear unit in FIG. 4.

FIG. 1 is a rear view showing the appearance of a rotation device for photovoltaic power generation according to a preferred embodiment of the present disclosure, FIG. 2 is a partial enlarged view of the rotation device in FIG. 1, FIG. 3 is an exploded perspective view showing the internal configuration of the rotation device in FIG. 2, FIG. 4 is a partial cross-sectional view of FIG. 1, and FIG. 5 is a partial enlarged cross-sectional view of FIG. 4.

Referring to FIGS. 1 to 5, the rotation device 100 for photovoltaic power generation according to a preferred embodiment of the present disclosure includes a first tubular body 101 connected to the rear surface of a solar panel array 15, a second tubular body 106 assembled below the first tubular body 101 with its bottom fixed to a pole 10, a driving motor 107 installed in the second tubular body 106 to provide a rotation force to the first tubular body 101, and a gear unit 109 to transmit the rotation force supplied from the driving motor 107 to the first tubular body 101. Additionally, preferably, the rotation device 100 for photovoltaic power generation includes a contact part having at least three contact points 102,103,104 installed at a coupled part of the first tubular body 101 and the second tubular body 106.

The solar panel array 15 basically includes a plurality of solar panels 15a connected in series. In addition, the solar panel array 15 may include the solar panel arrays 15a connected in parallel if necessary.

The solar panel array 15 is mounted on an inclined surface on top of the first tubular body 101, and is installed at an angle to the ground. The installation angle of the solar panel array 15 is determined by the angle of the inclined surface.

The pole 10 is installed upright vertically from the ground with its bottom fixed to the ground by a fastening means such as an anchor bolt. Preferably, the pole 10 may be a metal tubular body having a round outer circumferential surface like a typical street light pole, and may be made of a variety of other materials and shapes.

The first tubular body 101 is a pipe-shaped structure having the obliquely inclined upper surface on which a waterproof cover 105 is provided, and a circular circumferential surface. The waterproof cover 105 is detachably secured to open and close the internal space of the first tubular body 101, and in practice, acts as a flange.

The second tubular body 106 is a pipe-shaped structure having a circular circumferential surface which is assembled below the first tubular body 101. The second tubular body 106 has, at the bottom, a space into which the top portion of the pole 10 is inserted. When the pole 10 is inserted into the space, the second tubular body 106 is assembled on top of the pole.

To form a structurally stable assembly of the rotation device 100 and the pole 10 with improved coupling between them, the diameter of the first tubular body 101 and the second tubular body 106 may be designed at the equal or similar level to the diameter of the pole.

The gear unit 109 is interposed between the first tubular body 101 and the second tubular body 106 together with a predetermined bearing. The bearing is placed such that the central axis of rotation is perpendicular to the ground.

To minimize the occupied space, at least part of the gear unit 109 may be inserted into the hollow of the bearing. To decelerate the rotation force supplied from the driving motor 107 at an optimal ratio and transmit it to the first tubular body 101, the gear unit 109 preferably includes at least one planetary (PL) gear set.

As shown in FIG. 5, the gear unit 109 includes a PL gear set including a sun gear 112 connected to the rotation axis of the driving motor 107, a plurality of PL gears 110 arranged at a preset interval around the sun gear 112 to be engaged with the sun gear 112, and a ring gear 111 disposed outside of the plurality of PL gears 110 and fixed to the first tubular body 101 to be engaged with the PL gears 110. Here, the ring gear 111 may include an assembly of an upper ring gear 111a and a lower ring gear 111b stacked on one another.

At least one of the sun gear 112, the PL gears 110 or the ring gear 111 has inclined teeth and is shaped such that the gear circumferential surface (an outer or inner circumferential surface) is tapered. Most preferably, as shown in FIG. 5, the inclined teeth are formed at a preset pitch along the periphery of all the outer circumferential surface of the sun gear 112, the outer circumferential surface of the PL gears 110 and the inner circumferential surface of the ring gear 111. To be closely engaged with the inclined teeth of the PL gears 110, the upper ring gear 111a and the lower ring gear 111b of the ring gear 111 are preferably configured to have different inner diameters corresponding to the inclined surface of the PL gears 110.

Accordingly, each gear 110,111,112 has a tapered structure with a gradual decrease or increase in the outer diameter (or inner diameter) along the thickness-wise (height-wise) direction. According to this configuration, it is possible to ensure a proper backlash of a predetermined gap necessary for smooth rotation in the gear contact surface of each of the sun gear 112, the PL gears 110 and the ring gear 111 during the rotation of the PL gear set, and when the rotation ends, the gears go back to the original position by the self-weight or the elastic force of the spring and come into close contact with each other and are tightly engaged with each other by the tapered structure, thereby efficiently suppressing unnecessary backlash.

Preferably, the sun gear 112 has a cross section with a narrow upper part and a wide lower part, the PL gears 110 have a cross section with a wide upper part and a narrow lower part, an inner diameter of an upper part of the ring gear 111 is wider than an inner diameter of a lower part of the ring gear 111 to correspond to the inclined surface of the PL gears 110.

The plurality of PL gears 110 is installed such that a predetermined force is applied in an insertion direction into the sun gear 112 and the ring gear 111 by the gravity or the elastic force. To this end, a thrust bearing 113 and a wave spring 114 are preferably placed such that they overlap on an upper frame of a predetermined shape holding the plurality of PL gears 110. When a predetermined backlash of about a few millimeters is required in the contact surface between the gears during the rotation of the PL gear set, the plurality of PL gears 110 moves up a little bit in the opposite direction of the gravity or the elastic force to ensure backlash necessary for smooth rotation. In contrast, when the rotation of the PL gear set ends, the plurality of PL gears 110 moves down back to the original position and is tightly engaged with each other by the tapered structure, thereby preventing the rotation device 100 from swaying by external forces such as winds, and thus preventing the solar panel array 15 from shaking.

Among the sun gear 112, the PL gears 110 and the ring gear 111, the gears having the tapered structure may have various combination examples. In relation to this, FIGS. 6 to 10 show the variations of FIG. 5.

Figure 6:
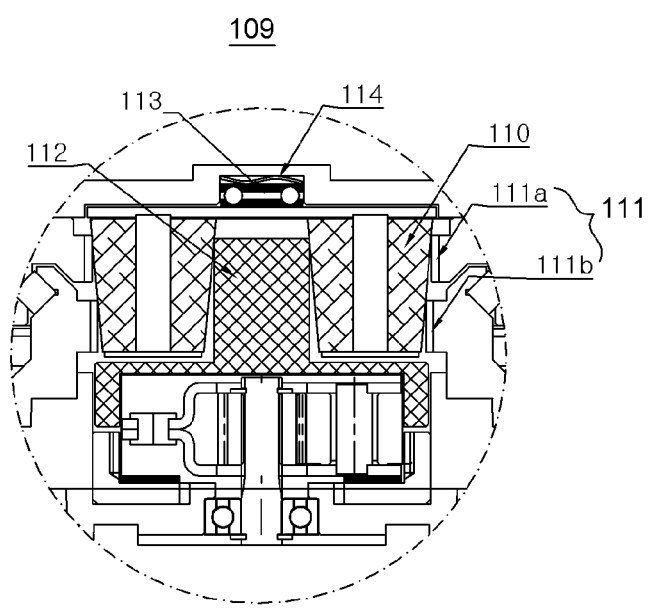
FIGS. 6 to 10 are cross-sectional views showing variations of FIG. 5.

As shown in FIG. 6, the inclined teeth that form the tapered structure may be only formed in the PL gears 110, and the sun gear 112 and the ring gear 111 may be configured to have vertical teeth. To be tightly engaged with the inclined teeth of the PL gears 110, the upper ring gear 111a and the lower ring gear 111b of the ring gear 111 may be configured to have different inner diameters corresponding to the inclined surface of the PL gears 110.

Figure 7:
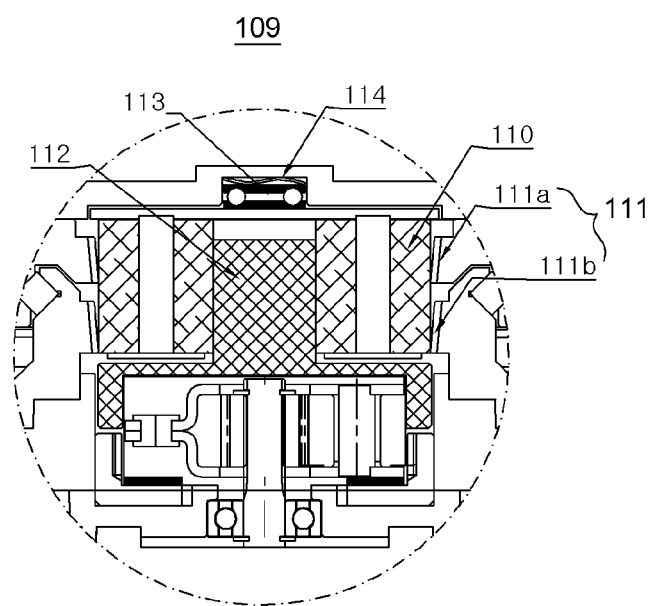

Alternatively, as shown in FIG. 7, the inclined teeth that form the tapered structure may be only formed in the inner circumferential surface of the ring gear 111, and the PL gears 110 and the sun gear 112 may be configured to have vertical teeth.

Figure 8:
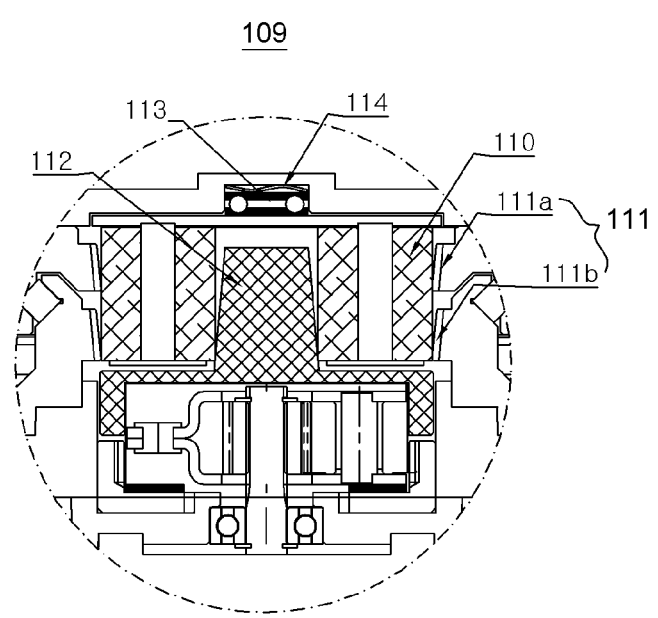

Alternatively, as shown in FIG. 8, the inclined teeth that form the tapered structure may be only formed in the sun gear 112 and the ring gear 111, and the PL gears 110 may be configured to have vertical teeth.

Figure 9:
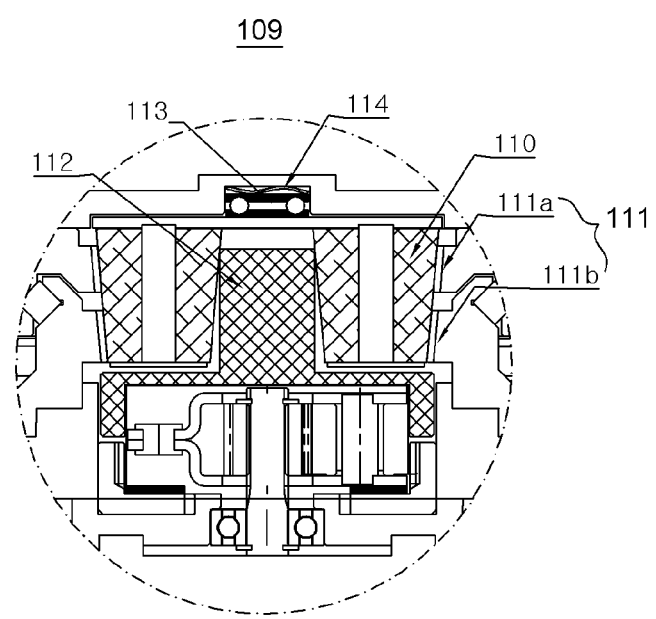

Alternatively, as shown in FIG. 9, the inclined teeth that form the tapered structure may be only formed in the PL gears 110 and the ring gear 111, and the sun gear 112 may be configured to have vertical teeth. To be tightly engaged with the inclined teeth of the PL gears 110, the upper ring gear 111a and the lower ring gear 111b of the ring gear 111 are preferably configured to have different inner diameters corresponding to the inclined surface of the PL gears 110.

Figure 10:
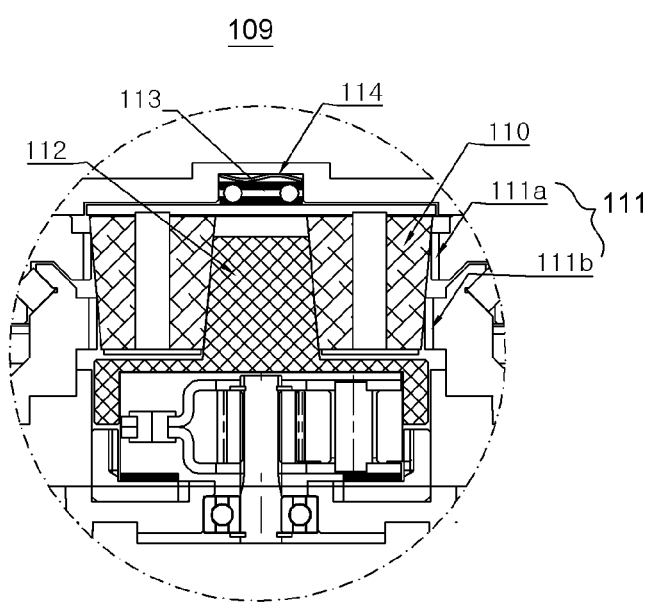

Alternatively, as shown in FIG. 10, the inclined teeth that form the tapered structure may be only formed in the PL gears 110 and the sun gear 112, and the ring gear 111 may be configured to have vertical teeth. To be tightly engaged with the inclined teeth of the PL gears 110, the upper ring gear 111a and the lower ring gear 111b of the ring gear 111 may be configured to have different inner diameters corresponding to the inclined surface of the PL gears 110.

The driving motor 107 is fixed to the inside of the second tubular body 106, preferably, upright coaxially with the second tubular body 106 to provide the rotation force to the gear unit 109.

Referring back to FIG. 3, the first contact point 102, the second contact point 103 and the third contact point 104 for power and/or signal transmission are installed at or around the coupled part or at the contact part of the first tubular body 101 and the second tubular body 106. Although not shown in the drawing, according to a variation of the present disclosure, the rotation device having more than three contact points may be provided.

The first contact point 102 and the second contact point 103 includes, respectively, a pair of contact points of conducting rings 102a,103a fixed in substantial connection to the second tubular body 106 and conducting blocks 102b, 103b which slide in contact with the upper surface of the conducting rings 102a,103a during relative rotations between the first tubular body 101 and the second tubular body 106. The conducting ring 102a of the first contact point 102 and the conducting ring 103a of the second contact point 103 are arranged in concentric circles. Any one of the first contact point 102 and the second contact point 103 becomes a negative terminal and the other becomes a positive terminal. The two terminals of the output of all the plurality of solar panels 15a are connected to the first contact point 102 and the second contact point 103, respectively. The output power through the first contact point 102 and the second contact point 103 is supplied to a power inverter 108 and is used to generate power (electricity to be delivered to energy companies).

The third contact point 104 includes a pair of contact points of a conducting ring 104a that is fixed to the rotating part of the gear unit 109 above the first contact point 102 and the second contact point 103 and rotates with the first tubular body 101 and a conducting block 104b that slides in contact with the lower surface of the conducting ring 104a during relative rotations between the first tubular body 101 and the second tubular body 106. The third contact point 104 is electrically connected to the positive terminal drawn from the output of some (for example, the output terminal of one solar panel 15a) of the plurality of solar panels 15a of the solar panel array 15. The output power through the third contact point 104 is used as power for the operation of the driving motor 107 and a predetermined printed circuit board (PCB). Preferably, the third contact point 104 is disposed at the inner position in the radial direction from the rotation axis of the rotation device, i.e., closer to the driving motor 107 than the second contact point 103 to supply the power to the driving motor 107 and the PCB.

Preferably, the first contact point 102 is used as the common negative terminal for the second contact point 103 and the third contact point 104. The electrical polarity assigned to the first contact point 102 to the third contact point 104 is not limited to the above-described embodiment and a variety of modifications may be made thereto.

The rotation device 100 for photovoltaic power generation configured as described above provides the rotation force of the driving motor 107 to the gear unit 109 to rotate the first tubular body 101 relative to the second tubular body 106, in order to allow the solar panel array 15 fixed to the top of the first tubular body 101 to slowly rotate. The first tubular body 101 rotates relative to the second tubular body 106 fixed to the pole 10 while stably supporting the solar panel 15a. The predetermined bearing is interposed between the first tubular body 101 and the second tubular body 106 to ensure structurally stable and smooth rotation. Preferably, the rotation path of the solar panel 15a is set to allow the solar panel 15a to be exposed to the Sun as much as possible taking the amount of sunlight into account. When the solar panel 15a rotates at a constant speed for a predetermined time, compared to the solar panel 15a placed in a fixed position facing the same direction, it is possible to increase the amount of solar power generated without using a solar tracker of a complicated structure.

Additionally, in addition to the solar panel array 15, a pole system for photovoltaic power generation including the rotation device 100 according to the present disclosure may include a vertically movable lighting unit and a vertically movable closed circuit television (CCTV) camera unit. In this case, when the lighting unit and the CCTV camera unit are lifted up as a first lifting wire and a second lifting wire are rolled up by the forward rotation of a drum embedded in a body of each unit and then coupled to each body disposed above the pole 10, power may be supplied to the lighting unit and the CCTV camera unit by the contact between the upper contact point and the lower contact point embedded in each body. Here, the power for the operation of the lighting unit and the CCTV camera unit may be, for example, supplied through the first contact point.

In the rotation device 100 for photovoltaic power generation according to the present disclosure, the rotation force from the driving motor 107 during operation is transmitted to the bearing through the gear unit 109 to rotate the upper ring of the bearing and the first tubular body 101 connected to the upper ring at the same time, and thus the solar panel array 15 slowly rotates. The first tubular body 101 rotates relative to the second tubular body 106 fixed to the pole while stably supporting the solar panel array 15.

The gear unit 109 includes the PL gear set to decelerate the rotation force of the driving motor 107 and transmit it to the first tubular body 101. The first tubular body 101 rotates with the solar panel array 15 fixed on the upper surface thereof.

It is possible to ensure a proper backlash of a predetermined gap necessary for smooth rotation in the gear contact surface of each of the sun gear 112, the PL gears 110 and the ring gear 111 during the rotation of the PL gear set, and when the rotation ends, the gears go back to the original position by the self-weight or the elastic force of the spring and come into close contact with each other and are tightly engaged with each other by the tapered structure, thereby preventing unnecessary backlash. The tapered structure is preferably formed in all the sun gear 112, the PL gears 110 and the ring gear 111, but even when the tapered structure is only formed in at least one of them, it is possible to suppress unnecessary backlash.

Compared to the prior art that simply connects the solar panel to the rotation axis of the driving motor to rotate the solar panel, the assembly including the solar panel 15a combined with the assembly of the first tubular body 101 and the second tubular body 106 can stably transmit the rotation force due to the diameter of the first tubular body 101 and the second tubular body 106 that is much larger than the diameter of the rotation axis of the driving motor. That is, it is possible to transmit the rotation force of the driving motor to the solar panel 15a without an error even when vibrations generated from the driving motor or external forces such as winds are applied.

While the present disclosure has been hereinabove described with respect to the limited number of embodiments and drawings, the present disclosure is not limited thereto and it is obvious that modifications and changes may be made thereto by persons having ordinary skill in the technical field pertaining to the present disclosure within the technical spirit of the present disclosure and the appended claims and their equivalents.

INDUSTRIAL APPLICABILITY

When the present disclosure is applied, it is possible to ensure necessary backlash during rotation, and prevent unnecessary backlash when the rotation ends by the close contact between the PL gears, the sun gear and the ring gear by the tapered structure, thereby preventing the solar panel from shaking in the wind. Accordingly, it is possible to firmly support the solar panel array installed on the pole and stably rotate without swaying by vibrations or external forces such as winds, thereby achieving solar power generation with high efficiency.

What is claimed is:
1. A rotation device for photovoltaic power generation installed on top of a pole to rotate a solar panel array, the rotation device for photovoltaic power generation comprising:
   a first tubular body connected to the solar panel array;
   a second tubular body coupled below the first tubular body and fixed to the top of the pole;
   a gear unit to transmit a rotation force to the first tubular body; and
   a driving motor fixed to an inside of the second tubular body to provide the rotation force to the gear unit,
   wherein the gear unit includes a planetary (PL) gear set including a sun gear connected to a rotational shaft of the driving motor, a plurality of PL gears arranged at a preset interval around the sun gear to be engaged with the sun gear and a ring gear disposed outside of the plurality of PL gears and fixed to the first tubular body to be engaged with the PL gears, and wherein all of the sun gear, the PL gears and the ring gear have inclined teeth in a circumferential surface and have a tapered structure, wherein the sun gear has a cross section with a narrow upper part and a wide lower part, the PL gears have a cross section with a wide upper part and a narrow lower part, an inner diameter of an upper part of the ring gear is wider than an inner diameter of a lower part of the ring gear to correspond to an inclined surface of the PL gears, wherein the rotation device comprises an upper frame installed on the plurality of PL gears to hold the plurality of PL gears, and wherein the plurality of PL gears moves toward the upper frame during the gear rotation to ensure backlash between the sun gear and the ring gear, and when the gear rotation ends, moves toward the sun gear and the ring gear by a self-weight to prevent backlash.

* * * * *